(12) United States Patent
Dear

(10) Patent No.: US 9,441,415 B2
(45) Date of Patent: Sep. 13, 2016

(54) WINDOW HAVING VACUUM INSULATED GLASS (VIG) UNIT AND FRAME INCLUDING VACUUM INSULATED STRUCTURE(S)

(71) Applicant: Guardian Industries Corp., Auburn Hills, MI (US)

(72) Inventor: Ryan L. Dear, Huntertown, IN (US)

(73) Assignee: Guardian Industries Corp., Auburn Hills, MI (US)

( * ) Notice: Subject to any disclaimer, the term of this patent is extended or adjusted under 35 U.S.C. 154(b) by 676 days.

(21) Appl. No.: 13/727,631

(22) Filed: Dec. 27, 2012

(65) Prior Publication Data

US 2014/0186556 A1 Jul. 3, 2014

(51) Int. Cl.
*E06B 3/66* (2006.01)
*E06B 3/263* (2006.01)
*E06B 3/267* (2006.01)

(52) U.S. Cl.
CPC ......... *E06B 3/6612* (2013.01); *E06B 3/2675* (2013.01); *E06B 3/26345* (2013.01); *E06B 2003/26321* (2013.01); *Y02B 80/24* (2013.01); *Y02B 80/28* (2013.01); *Y10T 428/24273* (2015.01)

(58) Field of Classification Search
CPC .............. E06B 2003/26321; E06B 3/26345; E06B 3/2675; Y10T 428/24273
USPC ........................................................ 428/212
See application file for complete search history.

(56) References Cited

U.S. PATENT DOCUMENTS

| | | | |
|---|---|---|---|
| 3,023,465 A * | 3/1962 | Sconzo ........................... | 49/436 |
| 5,500,305 A | 3/1996 | Bridges et al. | |
| 5,657,607 A | 8/1997 | Collins et al. | |
| 5,664,395 A | 9/1997 | Collins et al. | |
| 5,902,652 A | 5/1999 | Collins et al. | |
| 6,037,033 A | 3/2000 | Hunter | |
| 6,106,449 A | 8/2000 | Wynne | |
| 6,383,580 B1 | 5/2002 | Aggas | |
| 6,623,413 B1 | 9/2003 | Wynne | |
| 6,692,600 B2 | 2/2004 | Veerasamy et al. | |
| 6,701,749 B2 | 3/2004 | Wang et al. | |
| 6,782,718 B2 | 8/2004 | Lingle et al. | |
| 6,827,977 B2 | 12/2004 | Veerasamy | |
| 2012/0028027 A1* | 2/2012 | Hortrich ................... | 428/311.11 |
| 2012/0315409 A1* | 12/2012 | Jones .............................. | 428/34 |

FOREIGN PATENT DOCUMENTS

| | | |
|---|---|---|
| BF | 1 018 344 | 9/2010 |
| DE | 20 2007 013 688 | 1/2008 |
| DE | 10 2010 034 688 | 9/2011 |
| DE | 10 2011 018 746 | 10/2012 |
| WO | WO 00/71849 | 11/2000 |

OTHER PUBLICATIONS

U.S. Appl. No. 13/606,212, filed Sep. 7, 2012; Jones.
U.S. Appl. No. 13/606,096, filed Sep. 7, 2012; Jones.
U.S. Appl. No. 13/541,840, filed Jul. 5, 2012; Jones.
Developmental Product, Dow Corning "Vacuum Insulation Panel", 2pgs.
International Search Report mailed May 6, 2014.

* cited by examiner

*Primary Examiner* — Aaron Austin
*Assistant Examiner* — Lawrence Ferguson
(74) *Attorney, Agent, or Firm* — Nixon & Vanderhye P.C.

(57) ABSTRACT

A window includes a vacuum insulating glass (VIG) window unit in a window frame. The window frame includes at least one vacuum insulated structure (VIS) for improving the insulating functionality of the frame, so that the frame can adequately insulate the periphery of the VIG unit. Such windows may be used in residential and/or commercial window applications for buildings. The use of a window frame having at least one VIS is advantageous in that allows for improved window frame thermal performance and a narrow frame design if desired for improved aesthetics.

20 Claims, 4 Drawing Sheets

WINDOW HAVING VACUUM INSULATED GLASS (VIG) UNIT AND FRAME INCLUDING VACUUM INSULATED STRUCTURE(S)

TECHNICAL FIELD

The disclosure relates generally to vacuum insulated glass (VIG) window unit installation configurations and methods for installing a VIG window unit in a window frame, where the window frame includes at least one vacuum insulated structure (VIS). Such windows, including both the VIG window unit and the frame which includes at least one VIS, may be used in residential and/or commercial window applications for buildings such as for windows in homes, apartment buildings, office buildings, etc.

BACKGROUND AND SUMMARY OF EXAMPLE EMBODIMENTS

Vacuum insulating glass (VIG) units typically include two spaced apart glass substrates with an evacuated or low-pressure gap/space/cavity therebetween. The substrates are interconnected by a peripheral edge seal, which is located proximate a peripheral edge of the unit. VIG window units may include an array of spacers/pillars between the glass substrates to maintain spacing between the glass substrates and to avoid collapse of the glass substrates that may be caused due to the low pressure environment that exists between the substrates. Some example VIG window units are disclosed, for example, in U.S. Pat. Nos. 5,657,607, 5,664,395, 5,657,607, 5,902,652, 6,701,749 and 6,383,580, the disclosures of which are all hereby incorporated by reference herein in their entireties.

FIGS. 1 and 2 illustrate an example VIG window unit 1. For example, VIG unit 1 may include two spaced apart substantially parallel glass substrates 2, 3, which enclose an evacuated low-pressure space/cavity 6 therebetween. Glass sheets or substrates 2, 3 are interconnected by a peripheral edge seal 4 which may be made of fused solder glass or the like, for example. An array of support pillars/spacers 5 may be included between the glass substrates 2, 3 to maintain the spacing of substrates 2, 3 of the VIG unit 1 in view of the low-pressure space/gap 6 present between the substrates 2, 3. A coating such as a low-E coating (not shown) may be located on an interior surface of substrate 2 or substrate 3.

A pump-out tube 8 may be hermetically sealed by, for example, solder glass 9 or the like to an aperture/hole 10 that passes from an interior surface of one of the glass substrates 2 to the bottom of an optional recess 11 in the exterior surface of the glass substrate 2, or optionally to the exterior surface of the glass substrate 2. A vacuum is attached to and/or communicates with pump-out tube 8 to evacuate the interior cavity 6 to a low pressure that is less than atmospheric pressure, for example, using a sequential pump down operation. After evacuation of the cavity 6, a portion (e.g., the tip) of the tube 8 is melted to seal the vacuum in low pressure cavity/space 6. The optional recess 11 may retain the sealed pump-out tube 8. Optionally, a chemical getter 12 may be included within a recess 13 that is disposed in an interior face of one of the glass substrates, e.g., glass substrate 2. The chemical getter 12 may be used to absorb and/or bind with certain residual impurities that may remain after the cavity 6 is evacuated and sealed.

VIG units with peripheral edge seals 4 may be manufactured by depositing glass frit or other suitable material, in a solution (e.g., frit paste), around the periphery of substrate 2 (or on substrate 3). This glass frit paste ultimately forms the edge seal 4. The other substrate (e.g., 3) is brought down on substrate 2 so as to sandwich spacers/pillars 5 and the glass frit solution between the two substrates 2, 3. The entire assembly including the glass substrates 2, 3 and the seal material (e.g., glass frit in solution or paste) is then heated to a temperature at which point the glass frit melts, wets the surfaces of the glass substrates 2, 3, and ultimately forms a hermetic peripheral/edge seal 4.

After formation of the edge seal 4 between the substrates, a vacuum is drawn via the pump-out tube 8 to evacuate cavity 6 and thus form low pressure space/cavity 6 between the substrates 2, 3. The pressure in cavity/space 6 may be produced by way of an evacuation process to a level below atmospheric pressure, e.g., below about $10^{-2}$ Torr. To maintain the low pressure in the space/cavity 6, substrates 2, 3 are hermetically sealed via the edge seal 4 and sealing off of the pump-out tube. Small high strength spacers/pillars 5 are provided between the transparent glass substrates to maintain separation of the approximately parallel glass substrates against atmospheric pressure. As noted above, once the space 6 between substrates 2, 3 is evacuated, the pump-out tube 8 may be sealed, for example, by melting its tip using a laser or the like.

Dual pane VIG window units are generally much more efficient insulators than dual pane non-vacuum IG window units. VIG window units, while having better performance, are also significantly thinner than non-vacuum IG window units and thus can be advantageous with respect to reduced weight and/or aesthetics. It will be appreciated that standard non-vacuum IG window units are rather thick, and come in various thicknesses (e.g., from about 19-40 mm thick). On the other hand, VIG window units are often significantly thinner (e.g., from about 4-12 mm thick, more preferably from about 4-10 mm thick, more preferably from about 7-9 mm thick, with an example thickness being about 8.3 mm) than typical non-vacuum IG window units. And thermal performance of VIG units is dramatically better than that of non-vacuum IG window units (e.g., VIG units have higher R-values than do nonvacuum IG units).

A related art IG window unit, which is not a vacuum IG unit, is shown in FIG. 3 and includes a window frame surrounding a nonvacuum IG window unit. FIG. 3 illustrates nonvacuum IG window unit 30, which may include two panes of glass 36 defining an air or gas-filled gap 38 therebetween. The gap 38 is at atmospheric pressure, so it is not a vacuum window unit. The IG window unit 30 is shown seated in/on a window sash 32. The gap 38 between the glass substrates 36 is typically air and/or gas filled, and is at approximately atmospheric pressure (unlike a VIG window unit), and the interior space/gap 38 is sealed via peripheral spacer system 29. The vinyl sash 32 may include a first stop portion 35 that is part of and integral with main sash portion 32, a second removable stop 34 that may include a clip or other extending portion 37 for connecting the second stop 34 to the main sash portion 32 via a recess 32a. Voids/cavities defined in the sash 32 and/or stop 34 are filled with either air at atmospheric pressure or with expandable foam 31. Stops 34 and 35 may or may not be integral with main sash portion 32 which is provided under and/or adjacent the outer edge of the window unit. Stops 34 and 35 may be substantially parallel to each other. The IG window unit is held and/or positioned, directly or indirectly, between the stops 34, 35. When the IG unit 30 is seated in/on the sash portion 32 and is engaged with the first stop portion 35, the second stop 34 is connected to the sash 32, for example, via the clip or extended portion 37. The stops 34, 35 provide lateral support to the IG window unit 30. The sash 32 and stop portions 34, 35 may be made of material such as vinyl and/or PVC.

While the window frame of FIG. 3 is excellent for its intended purpose of insulating nonvacuum IG window units, the window frame shown in FIG. 3 is insufficient for adequately insulating the periphery of VIG window units. An example VIG window unit provides a COG efficiency of about R12. A VIG window unit, like an IG window unit, is to be mounted in a window frame which surrounds the VIG window unit. Conventional window frames include numerous voids which can be filled with insulating expandable foam (e.g., see foam 31 in FIG. 3) for increasing the insulating value of the frame. Unfortunately, the structure of conventional window frames reduces the overall performance of VIG window units because conventional window frames such as that shown in FIG. 3 do not sufficiently insulate the periphery of VIG window units. This is largely because of space constraints of the window design and insulative materials 31 utilized within such frames. Conventional window frames do not adequately insulate the periphery of VIG units to sufficiently reduce conduction through the glass/seal and/or through the frame itself. Typical insulating expandable foam 31, which is placed in frame voids/cavities as shown in FIG. 3, obtains an R5-R6 per inch of thickness. Thus, to obtain R-values approaching that of the VIG unit, the frame would be required to incorporate extremely thick foam segments in order to effectively insulate the perimeter of the VIG window unit.

Thus, it will be appreciated that there exists a need in the art for more effective window frames that can more efficiently and/or effectively insulate the perimeter of VIG window units.

In certain example embodiments of this invention, there is provided a window that includes a VIG window unit in a window frame. The frame includes at least one vacuum insulated structure (VIS) for improving the insulating characteristics of the frame, so that the frame can adequately insulate the periphery of the VIG unit. Such windows, including both the VIG window unit and the frame which includes at least one VIS, may be used in residential and/or commercial window applications for buildings and the like. The use of a window frame having at least one VIS is advantageous in that it allows for improved window frame thermal performance and a narrow frame design for improved aesthetics.

In certain example embodiments of this invention, there is provided a window comprising: a vacuum insulated glass (VIG) window unit in a window frame; said VIG window unit comprising first and second glass substrates with a low pressure gap provided therebetween, the low pressure gap being at pressure less than atmospheric pressure; said window frame comprising a plurality of elongated cavities; and a vacuum insulated structure located in at least one of said elongated cavities of said window frame, said vacuum insulated structure comprising a sealed flexible envelope that encases insulating material, and wherein an interior of said sealed flexible envelope is at a pressure less than atmospheric pressure.

In certain example embodiments of this invention, there is provided a window frame for use in a window including a vacuum insulated glass (VIG) window unit, said VIG window unit comprising first and second glass substrates with a low pressure gap provided therebetween, the low pressure gap being at pressure less than atmospheric pressure, the window frame comprising: a plurality of elongated cavities for extending along an edge portion of the window; and a vacuum insulated structure located in at least one of said elongated cavities, said vacuum insulated structure including a sealed envelope that encases insulating material, and wherein an interior of said sealed envelope is at a pressure less than atmospheric pressure.

In certain example embodiments of this invention, there is provided a window frame for use in a window including a window unit, said window unit comprising first and second glass substrates with a gap provided therebetween, the window frame comprising: a plurality of elongated cavities for extending along an edge portion of the window; and a vacuum insulated structure located in at least one of said elongated cavities, said vacuum insulated structure including a sealed envelope that encases insulating material, and wherein an interior of said sealed envelope is at a pressure less than atmospheric pressure.

These and other embodiments and/or advantages are described herein with respect to certain example embodiments and with reference to the following drawings in which like reference numerals refer to like elements throughout the several views, wherein:

DETAILED DESCRIPTION OF EXAMPLE EMBODIMENTS

Figure 2:
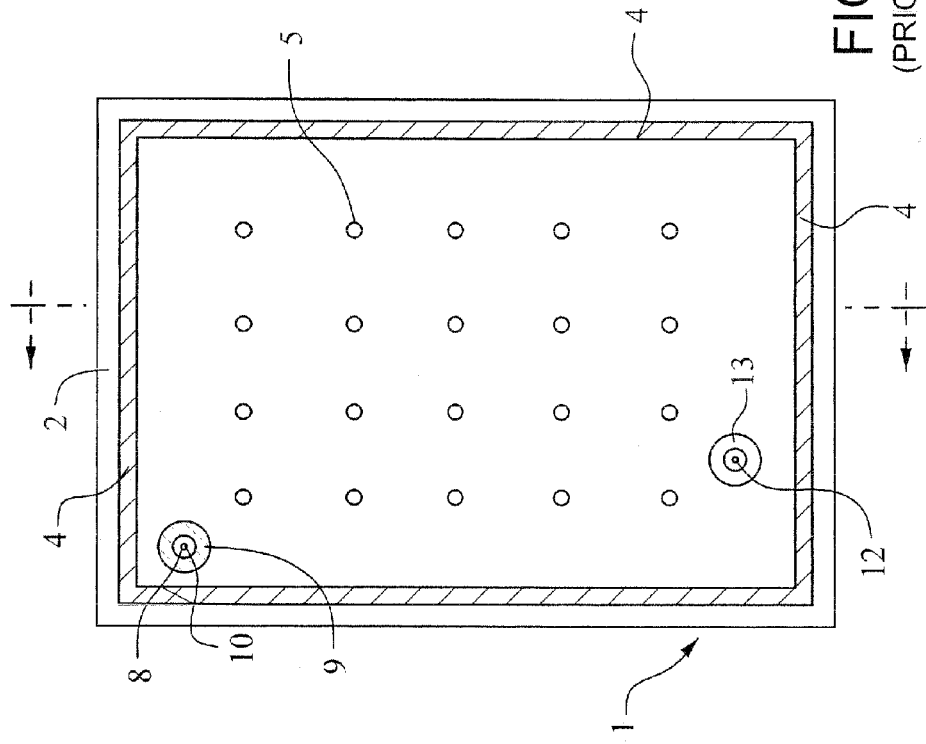
FIG. 2 is a top plan view of the example VIG unit of FIG. 1.
Figure 1:
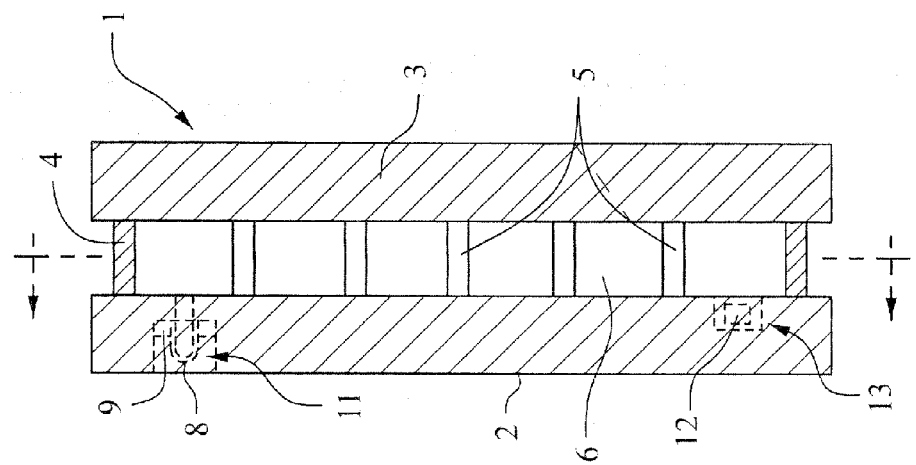
FIG. 1 is a cross sectional schematic diagram of an example VIG window unit.

Certain example embodiments will be described in detail herein with reference to the foregoing drawings in which like reference numerals refer to like elements throughout the several views. It will be understood that the embodiments described herein are intended to be illustrative, not limiting, and that those skilled in the art will understand that various modifications may be made without departing from the true spirit and full scope of the claims appended hereto.

Figure 4:
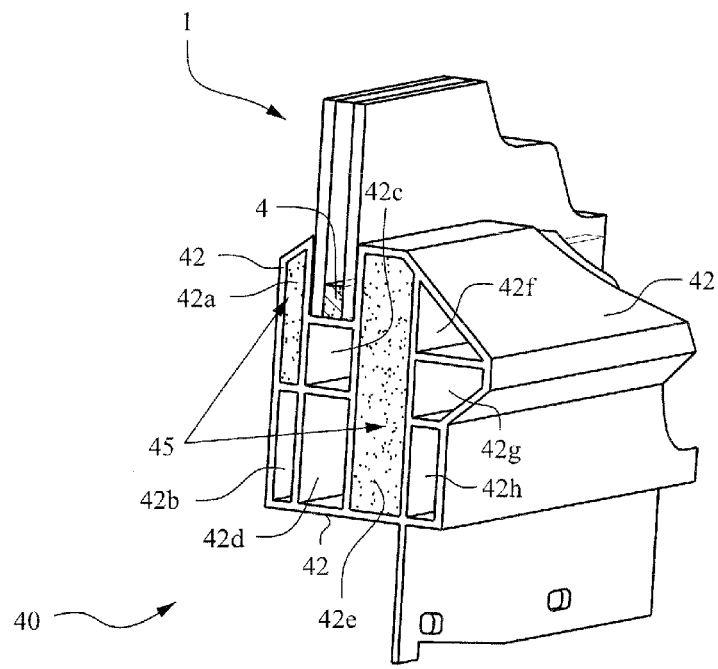
FIG. 4 is a schematic partial cross sectional diagram illustrating a window frame for a VIG window unit according to an example embodiment of this invention.
Figure 7:
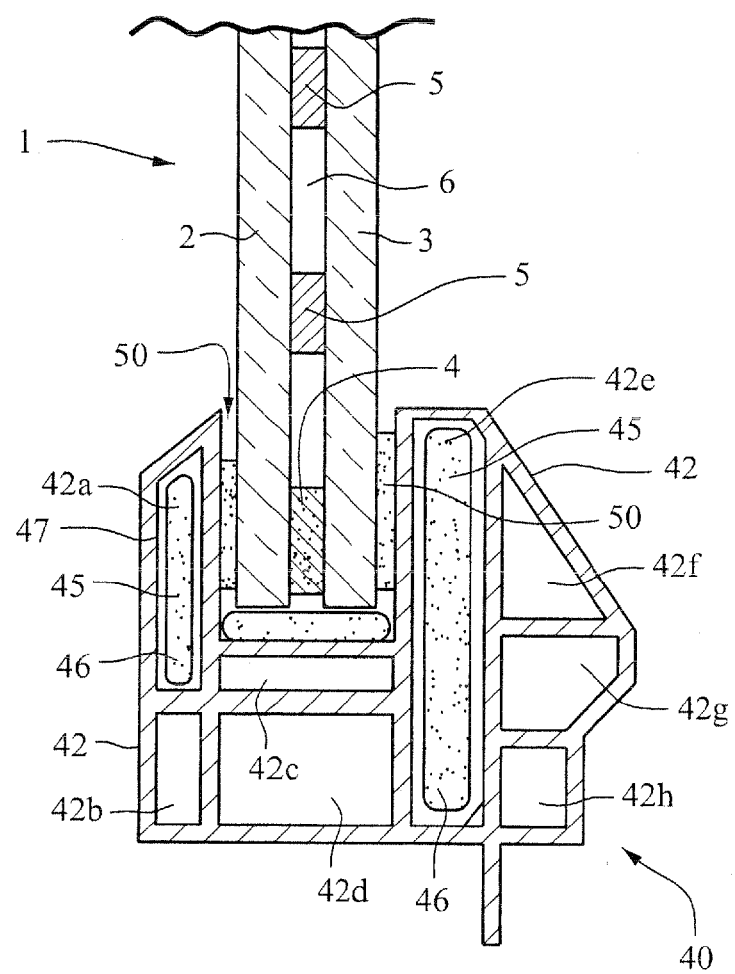
FIG. 7 is a cross sectional diagram illustrating the window frame of FIGS. 4-5 according to an example embodiment of this invention.

FIGS. 4 and 7 illustrate a window including a VIG window unit 1 in a window frame 40. The VIG window unit 1 includes at least first and second spaced apart substantially parallel glass substrates 2 and 3 which enclose an evacuated low-pressure space/cavity 6 therebetween. Glass substrates 2 and 3 are interconnected by a peripheral edge seal 4 which may be made of fused solder glass or other suitable material. An array of support pillars/spacers 5 is provided between at least the glass substrates 2, 3 to maintain the spacing of substrates 2, 3 of the VIG unit 1 in view of the low-pressure space/gap 6 present between the substrates 2, 3. A vacuum may be used via a pump-out tube to evacuate cavity 6 and thus form low pressure space/cavity 6 between the substrates 2, 3. The pressure in cavity/space 6 may be produced by way of an evacuation process to a level below atmospheric pressure, e.g., below about $10^{-2}$ Torr. A coating such as a low-F coating (not shown) may be located on an interior surface of substrate 2 or substrate 3. The VIG window unit 1 could also possibly have three substantially parallel spaced apart glass substrates (instead of two), with the gap between the third glass substrate (not shown) and the middle glass substrate being either at atmospheric pressure or below atmospheric pressure.

Figure 5:
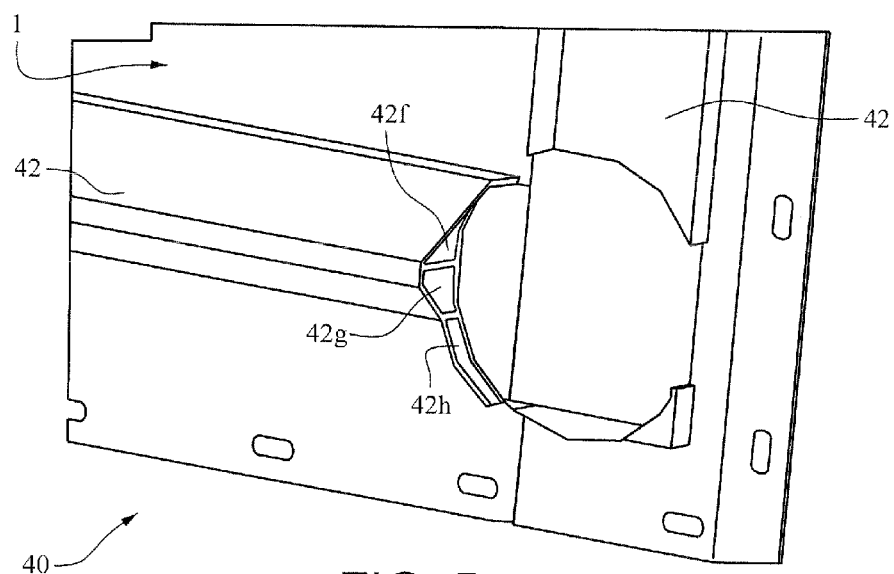
FIG. 5 is a plan view illustrating a corner portion of the window frame and VIG window unit of FIG. 4.

Still referring to FIGS. 4 and 7, the window frame 40 is located along and/or around the periphery of the VIG window unit 1. In particular, the window frame 40 may be made up of one or more parts and is provided along all four peripheral sides of the VIG window unit 1 (assuming a rectangular shaped VIG window unit 1). The frame 40 includes at least structure 42 such as a sash which may be made of a polymer based material such as vinyl, PVC or the like. The frame may include four such structures 42 around the periphery of the VIG unit 1, each structure 42 being provided along one of the four peripheral sides of the VIG window unit 1. At each of the four corners of the window, two structures 42 meeting at that corner may be butt jointed within the frame as shown in FIG. 5, or alternatively may be miter joined or lap jointed at the window corners. Thus, in embodiments where the window frame includes four structures 42 (one alone each side of the window), the structures 42 may be either butt jointed or miter jointed at the corners of the window. Adhesive strips (e.g., glazing tape, VHB strips, and/or wet glazing material) 50 may be provided on the exterior sides of the glass substrates 2, 3 of the VIG unit 1 for attaching the unit 1 to the window frame.

The structure 42 could also be a single four-sided unit in certain example embodiments of this invention, with each side extending along one of the four peripheral sides of the window unit 1. In such embodiments, each VIS 45 could also be a single piece having four sides (in the shape of a rectangle in plan view) corresponding to the four sides of the frame. In such embodiments, the periphery of the frame could be assembled and the cavity in which each VIS 45 is positioned is open at one side thereof. After the VIS 45 is placed in a cavity, a cover structure could be snapped, glued, or other secured in place to close the cavity and secure the VIS 45 in the cavity.

The structure of the frame 40 could also be made of wood or wood-like material in certain example embodiments of this invention. In such embodiments, at least one trough could be cut into the wood frame and a VIS structure could be placed in the at least one trough. Multiple troughs could be provided in the wood frame, and corresponding multiple VISs 45 could be provided in the respective troughs. The VISs could be provided in the assembled frame and a finish cap or the like could be adhered or otherwise secured over the trough thereby sealing the VIS(s) in the wood frame.

As best shown in FIGS. 4 and 7, each structure 42 of the frame has a plurality of elongated hollow cavities 42a, 42b, 42c, 42d, 42e, 42f, 42g and 42h defined therein. Hollow frame cavities 42a-42h preferably each extend along substantially an entirety of one or more of the four peripheral sides of the VIG unit 1, and may be of any suitable shape. When four similar structures 42 are provided along the four sides of the VIG window unit 1 (one alone each of the four sides of the window) and are respectively coupled/joined at the window corners, then the elongated cavities 42a-42h of each structure 42 extend along substantially the entirety of the side of the window on which the corresponding structure 42 is provided. Hollow cavities/channels 42a-42h in each structure 42 may or may not be open at ends thereof, with the hollow areas being surrounded by solid portions of structure 42 as shown in FIGS. 4 and 7 when viewed cross sectionally.

In the embodiment shown in FIGS. 4 and 7, elongated cavities 42b, 42c, 42d, 42f, 42g and 42h may simply be air filled or may be filled or substantially filled with insulating material such as foam or fiberglass. However, in the FIGS. 4 and 7 embodiment, elongated cavities 42a and 42e are each filled or substantially filled with a vacuum insulated structure (VIS) 45. Accordingly, a VIS 45 is provided in each of cavities 42a and 42e in the embodiment of FIGS. 4 and 7.

Figure 6:
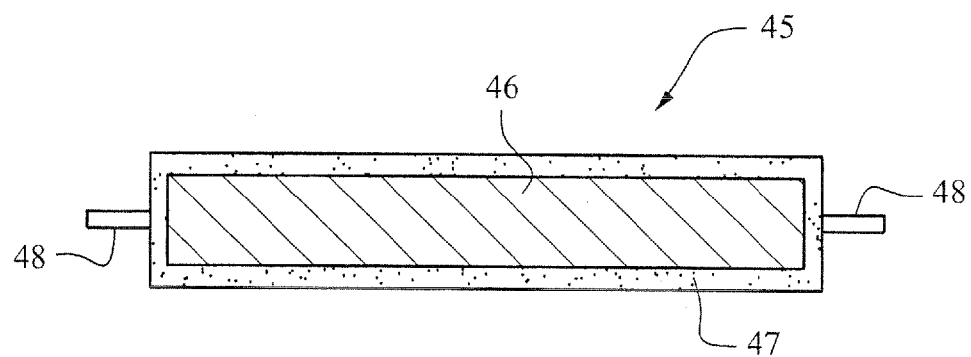
FIG. 6 is a cross sectional diagram illustrating an example VIP that may be used in the window frame of FIGS. 4-5 and 7 according to an example embodiment of this invention.

FIG. 6 is a cross sectional view of an example VIS 45. VIS 45 may have an inert or substantially inert insulative inorganic core material 46 encased in envelope 47. The surrounding flexible envelope 47 may be made of material such as foil or any other suitable material, and may include an aluminized multilayer barrier in certain example embodiments. The flexible envelope 47, which encases insulating core material 46 therein, may be hermetic and may be sealed via at least one thermal welded seam 48. The envelope 47 may be hermetic, thereby allowing the interior thereof to be pumped via a vacuum(s) to a medium vacuum and sealed, so that the interior 46 of the envelope 47 is at a pressure less than atmospheric pressure. The pressure inside envelope 47 may be from about $10^{-2}$ to $10^{-4}$ Torr in certain example embodiments. For example, the VIS 45 can achieve R-values of from 25-50, more preferably from about 35-50, per inch thickness of insulation depending upon the core material 46 and the level of vacuum inside envelope 47. A VIS of comparable thickness may be from about five to ten times more insulative than typical foam. For example, a one-quarter inch thick VIS could substantially equal or exceed the thermal performance of a VIG window unit and two inches of foam within a frame. Other example vacuum insulated structures (VISs) 45 which may be used are disclosed in U.S. Pat. Nos. 5,500,305, 6,037,033 and 6,623,413, the disclosures of which are hereby incorporated herein by reference.

In FIGS. 4 and 7, an elongated VIS 45 is provided in elongated frame cavity 42a, and another elongated VIS 45 is provided in elongated frame cavity 42e. Meanwhile, elongated frame cavities 42b-d and 42f-h in FIGS. 4 and 7 do not have VISs provided therein but are instead filled simply with air or optionally can be filled with foam or the like. However, a VIS 45 can be provided in any of cavities 42a-h in different embodiments of this invention. For example, in an example embodiment each of frame cavities 42a and 42e may be provided with at least one VIS therein as shown in FIGS. 4 and 7. In another example embodiment, each of frame cavities 42a, 42b, and 42e may be provided with at least one VIS 45 therein. In another example embodiment, only frame cavity 42e is provided with at least one VIS 45 therein. In yet another example embodiment, only frame cavity 42a is provided with at least one VIS 45 therein. In still another example embodiment, each of frame cavities 42a, 42b, 42c and 42e may be provided with a respective VIS 45 therein. It would also be possible for all frame cavities 42a-42h to each have a respective VIS 45 provided therein. These various embodiments may apply to each of the structures 42 of the overall window frame. The provision of VIS in window frame cavities, particularly in connection with windows having VIG window units, is advantageous in that it allows the window frame to approach, meet or exceed the insulating performance of the VIG window unit 1 itself.

Figure 3:
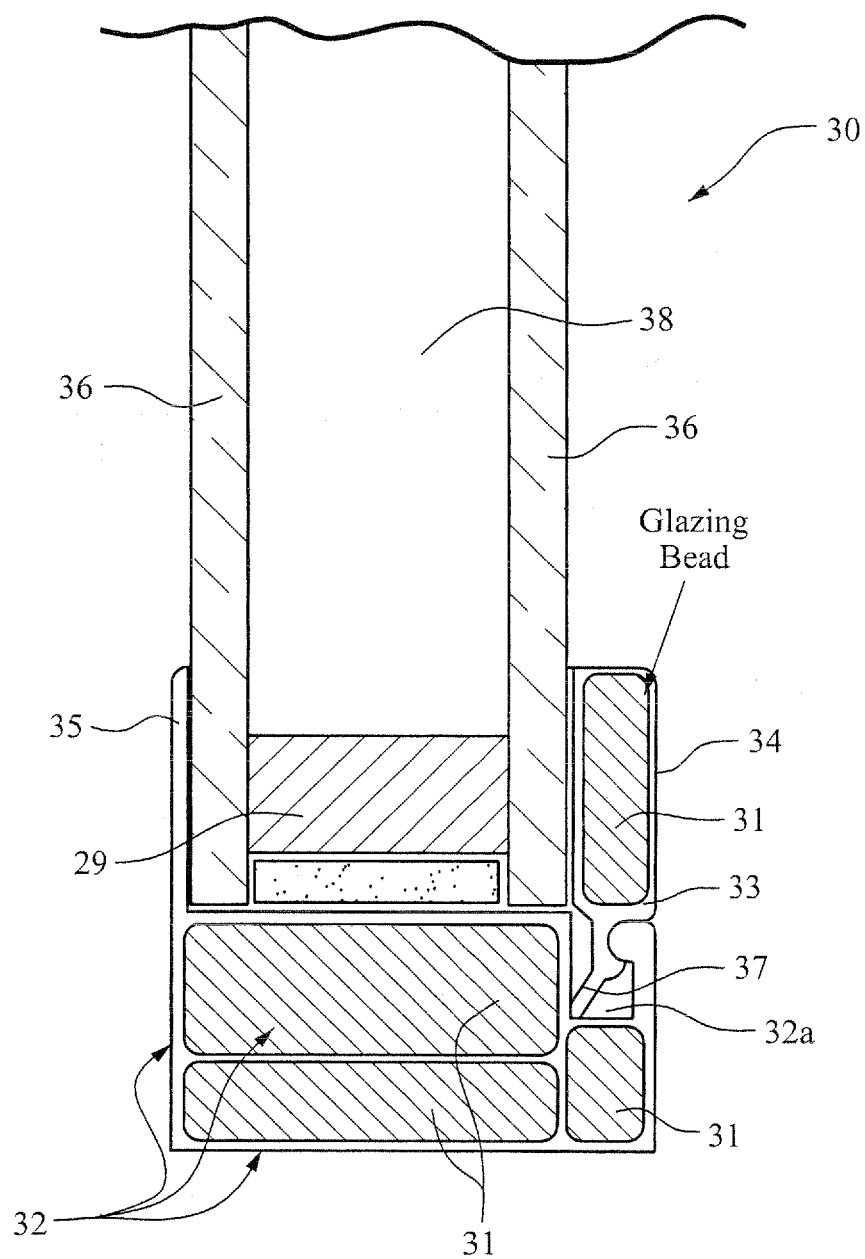
FIG. 3 is a schematic partial cross sectional diagram illustrating an example related art window frame designed for a standard non-vacuum IG window unit, with a non-vacuum IG window unit being located in the frame.

The window frame of FIGS. 4-5 and 7 could also be used with non-vacuum IG window units such as high performance nonvacuum IG window technology including but not limited to triple glazed IG units, quad glazed window units, and so forth. Thus, in certain example embodiments of this invention the window unit 1 could be a nonvacuum IG window unit 30 including at least two spaced apart glass substrates as shown in FIG. 3 where the gap between the substrates is at atmospheric pressure and may be filled with argon or the like.

In example embodiments of this invention, there is provided a window comprising: a vacuum insulated glass (VIG) window unit in a window frame; said VIG window unit comprising first and second glass substrates with a low pressure gap provided therebetween, the low pressure gap being at pressure less than atmospheric pressure; said window frame comprising a plurality of elongated cavities; and a vacuum insulated structure located in at least one of said elongated cavities of said window frame, said vacuum insulated structure comprising a sealed flexible envelope that encases insulating material, and wherein an interior of said sealed flexible envelope is at a pressure less than atmospheric pressure.

In the window of the immediately preceding paragraph, said vacuum insulated structure may be located in a first elongated cavity of the window frame, and another vacuum insulated structure may be located in a second elongated cavity of the window frame, wherein each of the vacuum insulated structures may comprise a sealed flexible envelope that encases insulating material with an interior of the sealed flexible envelope at pressure less than atmospheric pressure.

In the window of any of the preceding two paragraphs, the first and second elongated cavities of the window frame may be spaced apart from one another and may be located on opposite major sides of the VIG window unit.

In the window of any of the preceding three paragraphs, the first and second elongated cavities of the window frame may be oriented parallel or substantially parallel to each other.

In the window of any of the preceding four paragraphs, the window frame may include a third elongated cavity oriented parallel or substantially parallel to first and second elongated cavities, and wherein insulating foam, but not a vacuum insulated structure, may be provided in the third elongated cavity. The third elongated cavity may be located at least partially between the first and second elongated cavities.

In the window of any of the preceding five paragraphs, the VIG window unit may have four peripheral sides and two major sides (the major sides being the interior and exterior sides of the VIG window unit), and the window frame may comprise four frame members respectively provided along the four peripheral sides of the VIG window unit wherein each of the four frame members may comprise: a plurality of elongated cavities and a vacuum insulated structure located in at least one of said elongated cavities, said vacuum insulated structure comprising a sealed flexible envelope that encases insulating material, and wherein an interior of said sealed flexible envelope is at a pressure less than atmospheric pressure.

In the window of any of the preceding six paragraphs, the VIG window unit may comprise a plurality of spacers located in the low pressure gap between the first and second glass substrates, and an edge seal provided between the first and second glass substrates for hermetically sealing a periphery of the VIG unit to substantially maintain the low pressure gap at pressure less than atmospheric pressure.

In the window of any of the preceding seven paragraphs, the VIG window unit may have a thickness of from about 4-12 mm.

In the window of any of the preceding eight paragraphs, said flexible envelope may be of or include aluminum.

In the window of any of the preceding nine paragraphs, the interior of said sealed flexible envelope may be at a pressure of from about $10^{-2}$ to $10^{-4}$ Torr.

In the window of any of the preceding ten paragraphs, the low pressure gap between the substrates of the VIG window unit may be at a pressure of from about $10^{-2}$ to $10^{-4}$ Torr.

In the window of any of the preceding eleven paragraphs, shapes of the plurality of elongated cavities may be defined by polymer-based material of the frame. The polymer-based material may be of or include vinyl and/or PVC for example.

In the window of any of the preceding twelve paragraphs, the VIG window unit may have a visible transmission of at least about 30%, more preferably of at least about 50%, and even more preferably of at least about 60% or at least 70%.

In example embodiments of this invention, there is provided a window frame for use in a window including a vacuum insulated glass (VIG) window unit, said VIG window unit comprising first and second glass substrates with a low pressure gap provided therebetween, the low pressure gap being at pressure less than atmospheric pressure, the window frame comprising: a plurality of elongated cavities for extending along an edge portion of the window; and a vacuum insulated structure located in at least one of said elongated cavities, said vacuum insulated structure including a sealed envelope that encases insulating material, and wherein an interior of said sealed envelope is at a pressure less than atmospheric pressure.

In the window frame of the immediately preceding paragraph, said vacuum insulated structure may be located in a first elongated cavity of the window frame, and another vacuum insulated structure may be located in a second elongated cavity of the window frame wherein each of the vacuum insulated structures may comprises a sealed envelope that encases insulating material, with an interior of the sealed envelope at pressure less than atmospheric pressure.

In the window frame of any of the preceding two paragraphs, the first and second elongated cavities of the window frame may be spaced apart from one another and to be located on opposite major sides of the VIG window unit.

In the window frame of any of the preceding three paragraphs, the first and second elongated cavities of the window frame may be oriented substantially in parallel with each other.

The window frame of any of the preceding four paragraphs may further comprise a third elongated cavity that is oriented substantially parallel to first and second elongated cavities, and wherein insulating foam but not a vacuum insulated structure may be provided in the third elongated cavity.

While certain example embodiments have been described and disclosed herein, it will be understood that the embodiments described herein are intended to be illustrative, not limiting, and that those skilled in the art will understand that various modifications may be made without departing from the true spirit and full scope of the claims appended hereto.

What is claimed is:
1. A window comprising:
a vacuum insulated glass (VIG) window unit in a window frame;

said VIG window unit comprising first and second glass substrates with a low pressure gap provided therebetween, the low pressure gap being at pressure less than atmospheric pressure;

said window frame comprising a plurality of elongated cavities that do not contact the first or second glass substrates of the VIG window unit and that are not located between the first and second glass substrates of the VIG window unit;

a vacuum insulated structure located in at least one of said elongated cavities of said window frame, said vacuum insulated structure comprising a sealed flexible envelope that encases insulating material, and wherein an interior of said sealed flexible envelope is at a pressure less than atmospheric pressure; and wherein the sealed flexible envelope does not contact the first or second glass substrates of the VIG window unit, and no part of the sealed flexible envelope is located between the first and second glass substrates of the VIG window unit.

2. The window of claim 1, wherein said vacuum insulated structure is located in a first elongated cavity of the window frame, and another vacuum insulated structure is located in a second elongated cavity of the window frame, wherein each of the vacuum insulated structures comprises a sealed flexible envelope that encases insulating material, with an interior of the sealed flexible envelope at pressure less than atmospheric pressure.

3. The window of claim 2, wherein the first and second elongated cavities of the window frame are spaced apart from one another and are located on opposite major sides of the VIG window unit.

4. The window of claim 2, wherein the first and second elongated cavities of the window frame are oriented substantially in parallel with each other.

5. The window of claim 2, wherein the window frame includes a third elongated cavity that is oriented substantially parallel to the first and second elongated cavities, and
wherein insulating foam, but not a vacuum insulated structure, is provided in the third elongated cavity.

6. The window of claim 5, wherein the third elongated cavity is located at least partially between the first and second elongated cavities.

7. The window of claim 1, wherein the VIG window unit has four peripheral sides, and wherein the window frame comprises four frame members respectively provided along the four peripheral sides of the VIG window unit, and wherein each of the four frame members comprises:
a plurality of elongated cavities and a vacuum insulated structure located in at least one of said elongated cavities, said vacuum insulated structure comprising a sealed flexible envelope that encases insulating material, and wherein an interior of said sealed flexible envelope is at a pressure less than atmospheric pressure.

8. The window of claim 1, wherein the VIG window unit comprises a plurality of spacers located in the low pressure gap between the first and second glass substrates, and an edge seal provided between the first and second glass substrates for hermetically sealing a periphery of the VIG unit to substantially maintain the low pressure gap at pressure less than atmospheric pressure.

9. The window of claim 1, wherein the VIG window unit has a thickness of from about 4-12 mm.

10. The window of claim 1, wherein said flexible envelope comprises aluminum.

11. The window of claim 1, wherein the interior of said sealed flexible envelope is at a pressure of from about $10^{-2}$ to $10^{-4}$ Torr.

12. The window of claim 1, wherein the low pressure gap between the substrates of the VIG window unit is at a pressure of from about $10^{-2}$ to $10^{-4}$ Torr.

13. The window of claim 1, wherein shapes of the plurality of elongated cavities are defined by polymer-based material of the frame.

14. The window of claim 13, wherein the polymer-based material comprises vinyl and/or PVC.

15. The window of claim 1, wherein the VIG window unit has a visible transmission of at least about 50%.

16. A window frame for use in a window including a vacuum insulated glass (VIG) window unit, said VIG window unit comprising first and second glass substrates with a low pressure gap provided therebetween, the low pressure gap being at pressure less than atmospheric pressure, the window frame comprising:
a plurality of elongated cavities for extending along an edge portion of the window;
a vacuum insulated structure located in at least one of said elongated cavities, said vacuum insulated structure including a sealed envelope that encases insulating material, and wherein an interior of said sealed envelope is at a pressure less than atmospheric pressure, and
wherein the sealed envelope does not contact the first or second glass substrates of the VIG window unit, and no part of the sealed envelope is located between the first and second glass substrates of the VIG window unit.

17. The window frame of claim 16, wherein said vacuum insulated structure is located in a first elongated cavity of the window frame, and another vacuum insulated structure is located in a second elongated cavity of the window frame, wherein each of the vacuum insulated structures comprises a sealed envelope that encases insulating material, with an interior of the sealed envelope at pressure less than atmospheric pressure.

18. The window frame of claim 17, wherein the first and second elongated cavities of the window frame are spaced apart from one another and to be located on opposite major sides of the VIG window unit.

19. The window of claim 17, comprising a third elongated cavity that is oriented substantially parallel to the first and second elongated cavities, and
wherein insulating foam, but not a vacuum insulated structure, is provided in the third elongated cavity.

20. A window frame for use in a window including a window unit, said window unit comprising first and second glass substrates with a gap provided therebetween, the window frame comprising:
a plurality of elongated cavities for extending along an edge portion of the window;
a vacuum insulated structure located in at least one of said elongated cavities, said vacuum insulated structure including a sealed envelope that encases insulating material, and wherein an interior of said sealed envelope is at a pressure less than atmospheric pressure, and
wherein the sealed envelope does not contact the first or second glass substrates of the VIG window unit, and no part of the sealed envelope is located between the first and second glass substrates of the VIG window unit.

* * * * *